United States Patent [19]

San Pablo De La Rosa

[11] 3,893,550

[45] July 8, 1975

[54] HYDRAULIC SHOCK ABSORBER OF THE TELESCOPIC TYPE

[76] Inventor: Victoriano San Pablo De La Rosa, Manuel Gonzales Longaria No. 2, Madrid 10, Spain

[22] Filed: Oct. 23, 1973

[21] Appl. No.: 408,587

[30] Foreign Application Priority Data
Oct. 20, 1972 Spain .................................. 407795

[52] U.S. Cl. .................... 188/322; 74/57; 74/89.14; 74/89.15; 92/31
[51] Int. Cl. ............................................. F16f 9/32
[58] Field of Search .................. 188/271, 316, 322; 24/89.14, 89.15, 57; 92/31

[56] References Cited
UNITED STATES PATENTS

| | | | |
|---|---|---|---|
| 1,710,861 | 4/1929 | Chryst | 188/322 X |
| 2,398,231 | 4/1946 | Kott | 74/89.15 |
| 2,450,387 | 9/1948 | Thornhill | 188/322 |
| 3,628,638 | 12/1971 | Curchack | 188/322 X |

FOREIGN PATENTS OR APPLICATIONS

| | | | |
|---|---|---|---|
| 78,147 | 6/1955 | Netherlands | 188/322 |

*Primary Examiner*—George E. A. Halvosa
*Attorney, Agent, or Firm*—Wenderoth, Lind & Ponack

[57] ABSTRACT

A hydraulic shock absorber of the telescopic type has a cylinder and a piston rod movable axially within the cylinder and extending through a bore in a piston. One or more interengaging helical formations interposed between the piston rod and piston such that axial movement of the piston rod causes the piston to exert a pressure on the fluid in the cylinder.

7 Claims, 3 Drawing Figures

HYDRAULIC SHOCK ABSORBER OF THE TELESCOPIC TYPE

BACKGROUND OF THE INVENTION

The present invention relates to hydraulic shock absorbers of the telescopic type and while the invention is directed more particularly to such units as used on motor vehicles, it is to be understood it is also applicable to telescopic shock absorbers used on other apparatus.

The main problem in shock absorbers of the telescopic type is loss of fluid past the sealing means at the upper end of the cylinder since the greatest force occurs during extension of the shock absorber. In known telescopic shock absorbers the fluid pressure in the cylinder in which the piston is slidably mounted must not exceed certain limits, or otherwise a fluid film around the piston rod by-passes the sealing means.

Another problem in shock absorbers of the telescopic type is that due to abrasive particles deposited on the outer surface of the piston rod, the reciprocating motion of the rod when the shock absorber is in operation destroys the sealing means. An object of the invention is to overcome the above-mentioned problems and to provide a telescopic shock absorber having improved characteristics and performance. A further object of the invention is to simplify and cheapen the mass-production of telescopic shock absorbers.

SUMMARY OF THE INVENTION

The present invention consists in a hydraulic shock absorber of the type referred to comprising, a cylinder, a piston rod movable axially within the cylinder, a piston which is displaced axially and which rotates both in relation to the cylinder and also in relation to the rod, the piston having an axially disposed bore through which the piston rod extends and at least one interengaging helical formation interposed between the piston rod and piston and, at least one other helicoidal surface formed on its external cylindrical surface, which fits another helicoidal surface provided on the cylinder such that axial movement of the piston rod causes the piston to exert a pressure on the fluid in the cylinder and which fills chambers formed by the rod and the piston in the cylinder.

DETAILED DESCRIPTION OF THE INVENTION

Figure 1:
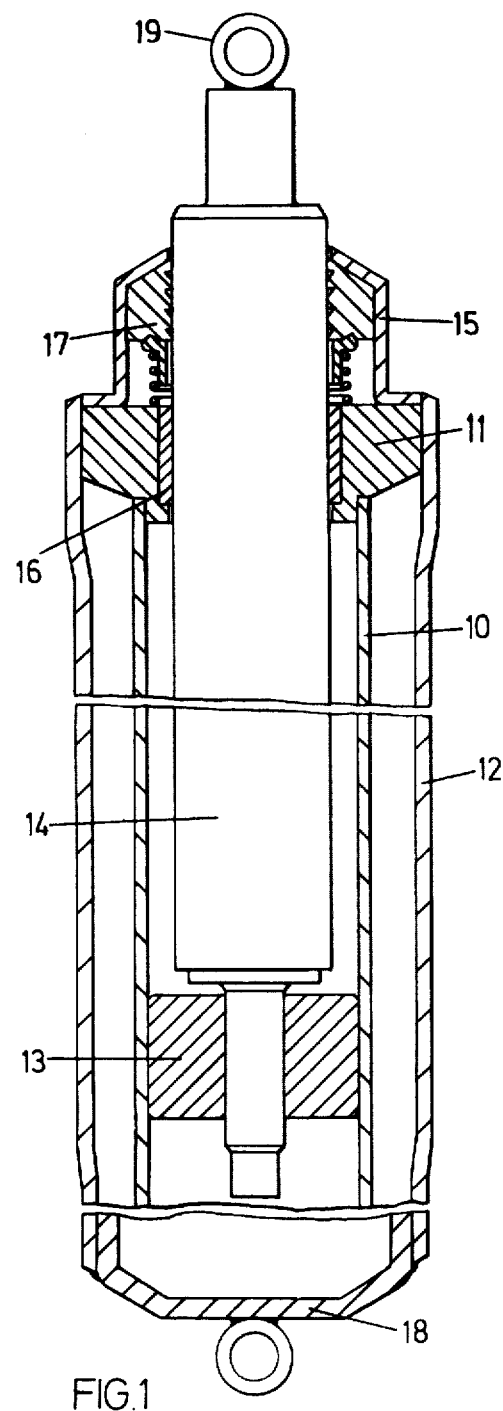
FIG. 1 is a longitudinal section through a known type of telescopic shock absorber.

FIG. 1 shows a conventional telescopic shock absorber comprising a cylinder 10, to the upper end of which is fixedly mounted a head 11 which is itself fixedly mounted in an outer tube 12. A piston 13, which possesses valves (not shown) for regulating passage of fluid to the chambers on opposite sides of piston 13, is slidably mounted in the cylinder 10 and fixedly connected to a piston rod 14 which extends through the head 11, the portion of the rod 14 exterior of the head 11 being partially protected by a cover 15 fixedly connected to the outer tube 12.

A bearing 16 positioned between the head and piston rod 14, and a lip catch 17 positioned between the cover 15 and piston rod 14 prevent, as far as possible, egress of the shock absorber fluid from the cylinder 10. The piston 13 is provided with regulating valves (not shown) which regulate passage of the fluid from one side of the piston to the other during operation of the shock absorber.

The lower end of the outer tube 12 is closed by a closure cap and eye assembly 18 by means of which the outer tube 12 is attached to the vehicle suspension, while the upper end of the piston rod 14 is provided with an eye member 19 which is attached to the vehicle frame.

Figure 2:
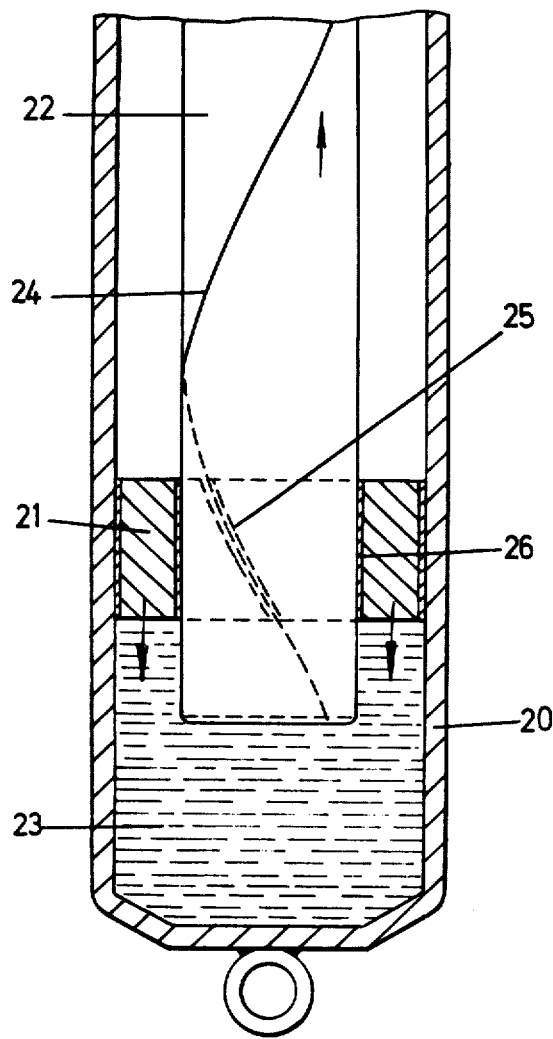
FIG. 2 is a longitudinal section through the lower end of a telescopic shock absorber according to the present invention.

In the first form of the invention shown in FIG. 2, the shock absorber comprises a cylinder 20, a piston 21 and a piston rod 22 which passes through a bore 26 in the centre of the piston 21. The pressure chamber 23 of the shock absorber is positioned only at the lower end of the cylinder 20 and is formed by the inner surface of the cylinder, the underside of the piston and a portion of the piston rod. The surface of the piston rod is provided with a helical rib 24 which engages in a helical groove 25 formed in the bore 26 of the piston 21.

During the period of extension of the piston rod 22 with respect to the cylinder 20, the piston 21 can be displaced in the same direction or in the opposite direction since the direction of displacement of the piston 21 in relation to the rod 22 depends on the inclination (slope) of the enegaged helicoidal surfaces, elements 24 – 25. Further, the relative rate of displacement between the piston rod depends on the pitch of the helicoidal surfaces. In one case, it was arranged for the displacement of the piston rod 22 in a certain period of time to be identical in magnitude to the displacement of the piston 21, but in opposite directions while fluid does not contact the bearing and lip catch positioned at the upper end of the cylinder as shown in FIG. 1.

As detailed above, fluid leakage occurs when a certain pressure is exceeded. The subject device allows much higher pressure to be achieved since the piston rotates as well as moves axially and since the axial displacement of the piston relative to the piston rod can be suitably chosen.

Figure 3:
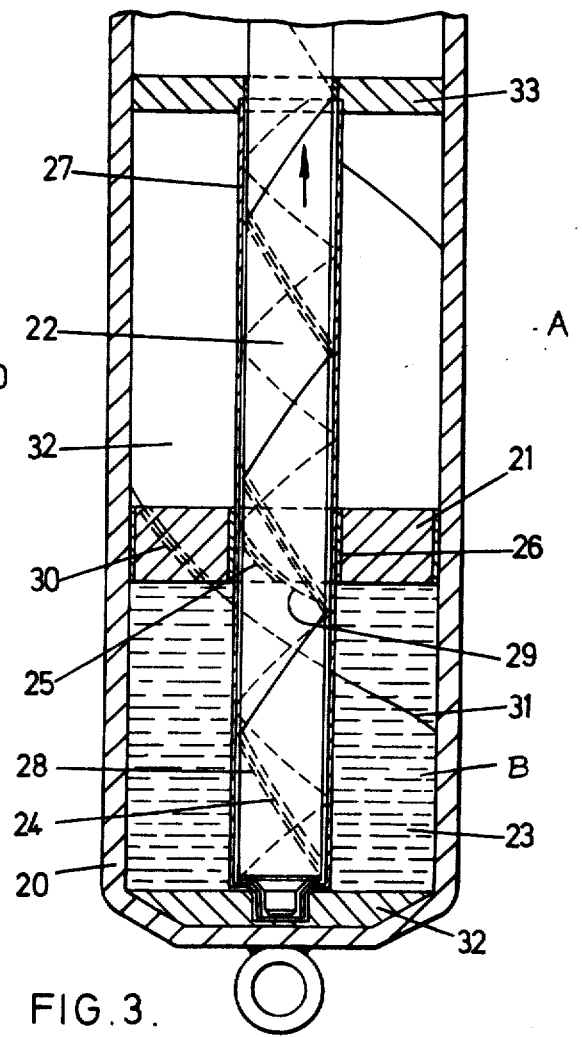
FIG. 3 is a view similar to FIG. 2, of an alternative form of the present invention which includes valves for regulating the passage of fluid between fluid chambers A and B.

The construction of the second form of shock absorber shown in FIG. 3 is similar to that described with reference to FIG. 2 and like reference numerals indicate like parts.

A sleeve 27 which surrounds the lower end of the piston rod 22 is interposed between the rod 22 and the piston 21. The inner surface of the sleeve 27 has a helical groove 28 which is identical to and engaged by the helical rib 24 on the piston rod 22. Upon a reciprocating movement of the piston rod 22, the helical rib 24 on the latter slides along the helical groove 28 formed in the sleeve 27.

The reciprocating motion of the piston rod 22 causes a rotative movement of the sleeve 27 around its own axis according to the pitch of the interengaging rib 24 and groove 28. Another helical rib 29 is formed or fixed on the outer surface of the sleeve 27 of such a shape that it engages and can slide in the helical groove 25 formed in the bore 26 of the portion 21. The use of the sleeve 27 obviously prevents the leakage of fluid past the piston rod seals since there is no contact therebetween. Moreover, the reasons detailed above in connection with FIg. 2 are also applicable.

Another feature of this invention is that another helical groove 30 formed in the outer cylindrical surface of the piston 21 is engaged by a helical rib 31 formed on the inner surface of the cylinder 20.

The shock absorber when in operation causes reciprocatory movement of the piston rod 22 which is transmitted to the piston 21 either directly as in FIG. 2 through an interengaging rib and groove formation, or through the sleeve 27 as in FIG. 3.

The piston 21, in the second embodiment of the shock absorber, is guided by the helical ribs 29 and 31 formed, respectively, on the sleeve 27 and cylinder 20 and also the piston 21 is subjected at the same time to an extension of the shock absorber by the fluid pressure in the chamber 23 and at the same time to a shortening of the floating piston 21 which is subjected to fluid pressure from a chamber 32 of a reduced value.

The movement of the floating piston 21 with respect to the displacement of the piston rod 22 depends on the pitch of the interengaging helical formations 24, 28, and 25, 29, and 30, 31.

The theory of movement of the piston 21 with respect to the reciprocating movement of the piston rod 22 when the cylinder 20 remains fixed is determined by the fact that the piston rod 22 is displaced, but does not rotate and causes the sleeve 27 to rotate. This rotation occurs owing to the sliding of the heliocoidal surface 24 formed on the rod 22 along the helicoidal surface 28 of the enveloping sleeve 27 which is supported between spaced members 32 and 33 fixedly mounted in the cylinder 20.

The helicoidal surface 31 causes the piston 21 to follow a sliding path along said helicoidal surface 31 when the sleeve 27 is in motion. Therefore, upon movement of the piston rod 22, the piston 21 follows a sliding path along the helical path of the helical rib 29. The piston 21 should be able to withstand the fluid pressure in the chambers 23 or 32 in such a way that this force is added to those originated between the supporting helical formations and the friction; a sum of forces in practice establishes equilibrium of the piston 21. The fluid pressure on the piston 21 can be adjusted by means of valves.

The most common embodiment of a shock absorbing device of this type is that which causes a displacement of the piston rod 22 and piston 21 which is the same but in opposite directions.

The helical formations 29 and 31 can be two, three or even more in number.

I claim:

1. A hydraulic shock absorber comprising: a cylinder having a first helicoidal surface on the interior thereof; a piston rod movable within said cylinder; a piston, said piston having at least one helicoidal surface adapted to coact with said helicoidal surface of said cylinder and having an axially disposed bore through which said piston rod extends, and at least one interengaging helical formation interposed between said piston rod and piston such that movement of the piston rod causes the piston to move along the piston rod, axial displacement of the piston exerting a pressure on fluid in said cylinder.

2. A hydraulic shock absorber as claimed in claim 1, wherein a sleeve is interposed between said piston rod and piston, said sleeve and said piston rod having engaging helicoidal surfaces and defining a first helical formation and the sleeve and the bore of the piston having engaging helicoidal surfaces and defining a second helical formation whereby during axial movement of the piston rod at least one of the helicoidal surfaces of the piston rod slides along helicoidal surfaces of said sleeve.

3. A hydraulic shock absorber as claimed in claim 2, wherein said first and second helical formations are of the same pitch and of different inclination.

4. A hydraulic shock absorber as claimed in claim 2, wherein said first and second helical formation are of different pitch and of the same inclination.

5. A hydraulic shock absorber as claimed in claim 2, wherein said first and second helical formations are of the same pitch and of the same inclination.

6. A hydraulic shock absorber as claimed in claim 2, wherein said first and second helical formations are of different pitch and of different inclination.

7. A hydraulic shock absorber as claimed in claim 2, wherein said sleeve is rotatably mounted between spaced members fixedly connected to said cylinder, the lower portion of the sleeve being closed in order to prevent fluid loss.

* * * * *